March 18, 1958  E. E. BUFFUM  2,827,337
SPROCKET DRIVE FOR ENDLESS TRACK TOP ROLLERS
Filed Jan. 11, 1957
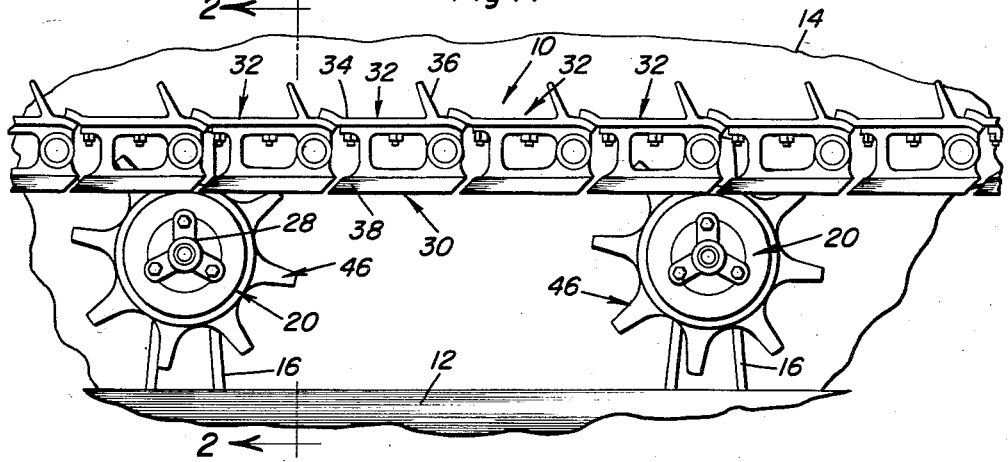
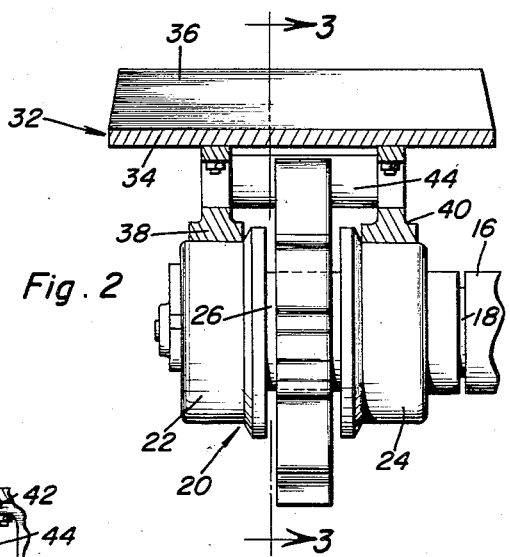
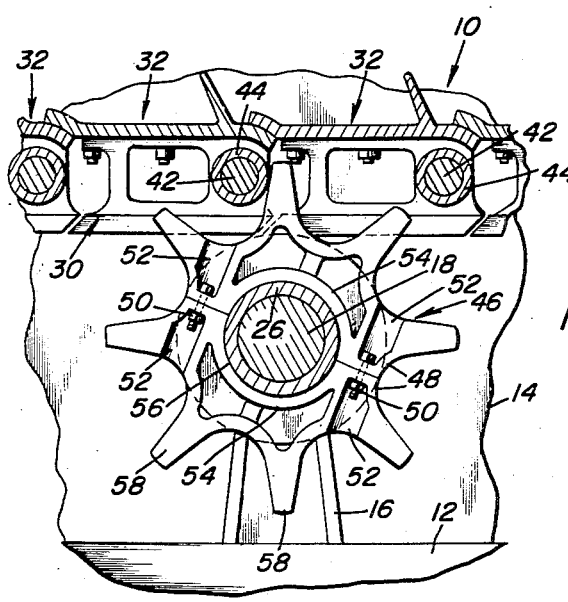
Edmond E. Buffum
INVENTOR.
BY
Attorneys

United States Patent Office 2,827,337
Patented Mar. 18, 1958

2,827,337

SPROCKET DRIVE FOR ENDLESS TRACK TOP ROLLERS

Edmond E. Buffum, Coos Bay, Oreg.

Application January 11, 1957, Serial No. 633,675

6 Claims. (Cl. 305—10)

This invention relates in general to new and useful improvements in a construction of endless tracks for vehicles, and more specifically to a sprocket drive for endless track top rollers.

All endless track assemblies utilize heavy-duty rollers for the track to run on. This includes both bottom rollers for transmitting the weight of the vehicle to the tracks and top rollers for carrying the weight of the track to keep the track in line. Because of the load placed upon the bottom rollers, these rollers continue to rotate with the track. However, the load on the top rollers is much less than that on the bottom rollers and as a result the top rollers frequently become clogged with snow, ice, mud or other debris and as a result stop rotating. When this happens the track rails continue to slide over the same surface of the top rollers wearing them flat so that they soon become ruined beyond repair. This, in turn, causes the track rails to wear out from skidding over the flattened top rollers.

In order to prevent damage to the top rollers of an endless track assembly, the only preventive maintenance possible is to keep the ice, snow, mud and other debris cleaned up from the vicinity of the top rollers. In most cases this has to be done several times daily. In many instances the preventive maintenance is not continued as often as is necessary and the top rollers soon become clogged and stop rotating.

It is therefore the primary object of this invention to provide a drive for the top rollers, the drive being of an extremely simple nature and requiring no maintenance. Another object of this invention is to provide an improved drive for top rollers of an endless track assembly, the drive being in the form of drive sprockets connected to the top rollers, the drive sprocket having teeth engageable with the inner part of the endless track for rotation thereby.

Still another object of this invention is to provide an improved endless track assembly with drive means for the top rollers thereof, the drive means being in the form of sprockets connected to the top rollers, the sprockets having teeth which are engageable with the pin bushings of the individual track sections so that the pin bushings will drive the sprockets which, in turn, will drive the top rollers.

A further object of this invention is to provide drive sprockets for endless track assemblies, the endless track assemblies including top rollers connected together by transverse hubs, the drive sprockets being mounted on the transverse hubs and having teeth engageable with the pin bushings of the individual track sections whereby as the endless track moves over the top rollers, the pin bushings will engage the teeth of the drive sprockets to turn the drive sprockets and the top rollers.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 1 is a fragmentary side elevational view of an upper part of an endless track assembly and shows the general relationship between the top rollers and an upper part of the endless track as it moves over the top rollers, the top rollers being provided with a drive sprocket which is the subject of this invention;

Figure 2 is an enlarged fragmentary sectional view taken substantially upon the plane indicated by the section line 2—2 of Figure 1 and shows the specific mounting of the drive sprocket on a transverse hub extending between a pair of top rollers; and Figure 3 is an enlarged fragmentary sectional view taken upon the plane indicated by the section line 3—3 of Figure 2 and shows further the details of the drive sprocket and relationship thereof with respect to the pin bushings of the individual track sections.

Referring now to the drawings in detail, it will be seen that there is illustrated a portion of an endless track assembly which is referred to in general by reference numeral 10. The endless track assembly 10 includes a support 12 which is part of a vehicle 14 on which the endless track assembly 10 is mounted. Extending upwardly from the support 12 are individual supports 16 which are spaced longitudinally of the support 12 and which carry at the upper ends transversely extending axles 18 on which there are mounted top roller assemblies 20.

As is best illustrated in Figure 2, its top roller assembly 20 includes a pair of transversely spaced top rollers 22 and 24, the top roller 22 being disposed transversely outermost of the two top rollers. The top rollers 22 and 24 are connected together by a hub 26 which extends transversely between the two top rollers 22 and 24 and which is journaled on the axle 18. The top roller assembly 20 is retained on the axle 18 by a suitable retainer assembly 28, best illustrated in Figure 1.

Rolling over the top rollers 22 and 24 is that portion of an endless track assembly 30 which is momentarily uppermost. The top rollers 22 and 24 serve to support the weight of the portion of the endless track 30 which is disposed uppermost and are returned by engagement of the endless track 30 therewith. The endless track 30 is formed of a plurality of identical track sections 32 each of which includes an outermost ground engaging plate 34 carrying an interval transversely extending cleat 36. Secured to the underside of the ground engaging plate 34 is a pair of transversely spaced rails 38 and 40, which, as is best illustrated in Figure 2, engage the top rollers 22 and 24, respectively, to support the track sections 32.

The individual track sections 32 are connected together by a pin 42. Each pin 42 is carried by one track section 32 and is rotatably journaled in pin bushings 44 carried by the rails 38 and 40 of the next adjacent track section 32. This permits the flexible coupling of the individual track sections. In order that the top rollers 22 and 24 may be positively rotated as the endless track 30 moves thereover, there is provided for each top roller assembly 20 a drive sprocket which is referred to in general by the reference numeral 46. Each drive sprocket 46 is formed of a pair of identical split halves 48 which are secured together by four bolts 50. The bolts 50 are disposed in pairs on opposite sides of the halves 48 and are seated in recesses 52. The halves 48 of the sprocket 46 include hubs 54 which define a bore 56 of a size whereby when the halves 48 are clamped together by the bolts, the hubs 54 tightly clamp the transverse hub 26 connecting together the top rollers 22 and 24.

Each drive sprocket 46 is provided with a plurality of radiating teeth or fingers 58 which are of a size so as to engage the pin bushings 44. First as the endless track 30 moves over the top roller assemblies 20, the pin bushings 44 engage the teeth of fingers 58 and effect rotation of the driving sprockets 46. Since the drive sprockets 46 are connected to the top rollers 22 and 24, it will be readily apparent that the top rollers 22 and 24 are rotated and thus prevent it from clogging due to the presence of snow, ice, mud or other debris.

Although the drive sprockets 46 have been illustrated and described as being clamped on the transverse hubs 26, it is to be understood that this construction is that which will be used upon a majority of the endless track assemblies but it is not the only construction which may be utilized. In certain endless track assemblies, it may be desirable to weld the hubs of the sprockets directly to the individual top rollers. On other types of endless track assemblies, it may be desirable to form the top rollers with the sprockets integrally cast into the outer roller shell.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. In combination with an endless track of the type including top rollers and a track guidingly engaged on said top rollers, drive sprockets for said top rollers, said drive sprockets being connected to said top rollers and having teeth engaged with the inner part of said track whereby said track drives said sprockets which in turn drive said top rollers.

2. In combination with an endless track of the type including top rollers and a track guidingly engaged on said top rollers, said track including a plurality of track sections each having a transverse pin bushing on the inner part thereof, drive sprockets for said top rollers, said drive sprockets being connected to said top rollers and having teeth engaged with said pin bushings whereby said pin bushings drive said sprockets as said track moves over said top rollers to effect rotation of said top rollers.

3. In combination with an endless track of the type including top rollers and a track guidingly engaged on said top rollers, said top rollers being arranged in transversed pairs connected together by a transverse hub, drive sprockets for said top rollers, said drive sprockets being mounted on said transverse hubs, and having teeth engaged with the inner part of said track whereby said track drives said sprockets which in turn drive said top rollers.

4. In combination with an endless track of the type including top rollers and a track guidingly engaged on said top rollers, said top rollers being arranged in transversed pairs connected together by a transverse hub, drive sprockets for said top rollers, said drive sprockets being mounted on said transverse hubs, and having teeth engaged with the inner part of said track whereby said track drives said sprockets which in turn drive said top rollers, each of said drive sprockets being formed in diametrically split halves, means clamping said halves together and on said hubs.

5. In combination with an endless track of the type including top rollers and a track guidingly engaged on said top rollers, said track including a plurality of track sections each having a transverse pin bushing on the inner part thereof, said top rollers being arranged in transversed pairs connected together by a transverse hub, drive sprockets for said top rollers, said drive sprockets being mounted on said transverse hubs and having teeth engaged with the inner part of said track whereby said track drives said sprockets which in turn drive said top rollers.

6. In combination with an endless track of the type including top rollers and a track guidingly engaged on said top rollers, said track including a plurality of track sections each having a transverse pin bushing on the inner part thereof, said top rollers being arranged in transversed pairs connected together by a transverse hub, drive sprockets for said top rollers, said drive sprockets being mounted on said transverse hubs and having teeth engaged with the inner part of said track whereby said track drives said sprockets which in turn drive said top rollers, each of said drive sprockets being formed in diametrically split halves, means clamping said halves together and on said hubs.

References Cited in the file of this patent

UNITED STATES PATENTS

| | | |
|---|---|---|
| 1,292,286 | Faust | Jan. 21, 1919 |
| 1,331,550 | Wishon | Feb. 24, 1920 |